(12) United States Patent
Nguyen et al.

(10) Patent No.: US 11,467,971 B2
(45) Date of Patent: Oct. 11, 2022

(54) SYSTEMS AND METHODS FOR ACCELERATING DATA COMPUTATION

(71) Applicant: Workday, Inc., Pleasanton, CA (US)

(72) Inventors: Ngoc Nguyen, Cupertino, CA (US); Darren Kermit Lee, Sunnyvale, CA (US); Ilan Cohen, Santa Clara, CA (US); Crichton McCutcheon, Miami Beach, FL (US); Christof Bornhoevd, Belmont, CA (US)

(73) Assignee: Workday, Inc., Pleasanton, CA (US)

(*) Notice: Subject to any disclaimer, the term of this patent is extended or adjusted under 35 U.S.C. 154(b) by 256 days.

(21) Appl. No.: 16/114,542

(22) Filed: Aug. 28, 2018

(65) Prior Publication Data

US 2019/0188143 A1   Jun. 20, 2019

Related U.S. Application Data

(60) Provisional application No. 62/551,564, filed on Aug. 29, 2017.

(51) Int. Cl.
| | |
|---|---|
| *G06F 12/0891* | (2016.01) |
| *G06F 12/0815* | (2016.01) |
| *G06F 17/18* | (2006.01) |
| *G06F 40/18* | (2020.01) |
| *G06Q 10/06* | (2012.01) |
| *G06F 9/54* | (2006.01) |
| *G06F 9/445* | (2018.01) |
| *G06Q 10/08* | (2012.01) |

(52) U.S. Cl.
CPC ...... *G06F 12/0891* (2013.01); *G06F 9/44536* (2013.01); *G06F 9/544* (2013.01); *G06F 12/0815* (2013.01); *G06F 17/18* (2013.01); *G06F 40/18* (2020.01); *G06Q 10/06* (2013.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 5,303,146 | A * | 4/1994 | Ammirato | G06F 40/18 |
| | | | | 715/204 |
| 5,819,102 | A * | 10/1998 | Reed | G06F 9/3877 |
| | | | | 712/34 |
| 6,453,404 | B1 * | 9/2002 | Bereznyi | G06F 12/023 |
| | | | | 711/119 |

(Continued)

*Primary Examiner* — Kyle R Stork
(74) *Attorney, Agent, or Firm* — Van Pelt, Yi & James LLP (57) ABSTRACT

Systems and methods for precomputing data and storing cache objects corresponding to the precomputed data are described. A system creates a new cache object when a user interacts with the system. The system precomputes formulas in the newly created cache object by replacing the formulas with corresponding calculated values. The system precomputes the formulas in the background (i.e., the user is not presented with the precomputed values while the user is manipulating the data). The system may persistently store a precomputed version cache object in a dedicated version cache storage for later use. If updates are performed to the structure and/or values of a version represented in a precomputed version cache object, effected parts of the version cache object are invalidated by replacing calculated values with the underlying formulas.

21 Claims, 7 Drawing Sheets

(56) References Cited

U.S. PATENT DOCUMENTS

| | | | |
|---|---|---|---|
| 9,158,832 B1* | 10/2015 | Hiatt | G06F 40/14 |
| 9,836,514 B2* | 12/2017 | Kruglick | G06F 16/27 |
| 2002/0169658 A1* | 11/2002 | Adler | G06Q 30/0205 |
| | | | 705/7.28 |
| 2004/0162885 A1* | 8/2004 | Garg | G06F 16/27 |
| | | | 709/213 |
| 2005/0120061 A1* | 6/2005 | Kraft | G06F 16/24552 |
| 2010/0031137 A1* | 2/2010 | Amaral | G06F 16/972 |
| | | | 715/234 |
| 2015/0161048 A1* | 6/2015 | Patil | G06F 16/172 |
| | | | 711/141 |
| 2015/0278328 A1* | 10/2015 | Honsowetz | G06F 16/2282 |
| | | | 707/739 |

* cited by examiner

SYSTEMS AND METHODS FOR ACCELERATING DATA COMPUTATION

This application claims priority to U.S. Provisional Application No. 62/551,564 entitled SYSTEMS AND METHODS FOR ACCELERATING DATA COMPUTATION filed Aug. 29, 2017 which is incorporated herein by reference for all purposes.

BACKGROUND

A computing system may be configured to compute output data based on planning data received from end users. Planning data may be text data formatted as, for example, extensible markup language (XML) including cells with values. Some of the cells may include numeric values. Other cells may include formulas. The computing system may execute the formulas with respect to the numeric values to compute the output data.

Planning data may include billions of cells that require calculation. For example, inventory planning data may include tens of thousands of cells representing parts, thousands of cells representing products, and hundreds of cells representing warehouses. An end user of the system may, at any point in time, make interactive changes to the plan data (e.g., change a numeric value of a cell to another numeric value, change a formula of a cell to another formula, change a numerical value of a cell to a formula, change a formula of a cell to a numeric value, etc.). The system may be expected to recalculate results data for the interactive changes in substantially real-time (e.g., a few seconds). Computation of output data may be extensive due to the magnitude of the analyzed cells. The magnitude of the cells may be a Cartesian product of the different dimensions of the plan data (e.g., the number of cells plan data may equal the number of locations multiplied by the number of products further multiplied by the number of stores, and so on). The greater the magnitude of the cells, the more latency that is perceived by the end user.

The duration of computing the output data may also be increased due to the complexity of the formulas in the planning data. For example, some formulas may relate to cells being rolled forward in time or rolled up across dimensions. Calculation of these formulas is difficult because the formulas often refer to other formulas within the same sub-model of the planning data or formulas represented in other sub-models of the planning data. This results in long recursive evaluations across dependent formulas and increased latency.

The duration of computing the output data may further be increased due to the formulas instructing the computing system to calculate multiple outcomes for a given set of planning data. For example, formulas of the planning data may instruct the computing system calculate one version where production of a set of products is increased, a second version where production of a set of products is decreased, a third version modeling a best case scenario, a fourth version modeling a worst case scenario, a fifth version modeling an average case scenario, etc. The complexity of the calculations increases as the number of output versions increases, and thereby increases latency.

SUMMARY

The present disclosure provides systems and methods for precomputing data and storing cache objects corresponding to the precomputed data. The system creates a new cache object when a user interacts with the system, namely when the user either updates an existing plan version or creates a new plan version in the system. The system precomputes formulas in the newly created cache object by replacing the formulas with corresponding calculated values. The system precomputes the formulas in the background (i.e., the user is not presented with the precomputed values while the user is manipulating the data). The system may persistently store the precomputed version cache object in a dedicated version cache storage for later use. If updates are performed to the structure and/or values of a version represented in a precomputed version cache object, effected parts of the version cache object are invalidated by replacing calculated values with the underlying formulas.

The system may precompute formulas from multiple plan versions while a user interacts with the system. Such calculations may be initiated when a new version is loaded from the persistent version cache storage into memory in the form of a version cache object. A version cache object is thereby an optimized in-memory data structure that supports rapid calculation of vast numbers of interdependent formulas. In regular interaction evaluation, formulas in a cache object are replaced with corresponding values over time. In contrast, the system described herein precomputes all formulas in a cache object at once or substantially at once, thereby completely replacing all formulas with corresponding values.

In some instances, the system may engage in regular formula evaluation in which the system does not leverage precomputed cache objects. Such implementation may result in more latency than if such computations were performed using precomputed cache objects. However, such implementation nonetheless enables the system to display updated results data as part of an interactive user session.

The present disclosure enables a system to compute formulas referring to values in multiple data versions in near real-time using backend processing. The teachings of the present disclosure also reduce the first-person penalty encountered when a user logs into the system but the associated version cache for the version the user wants to use is not in memory, and therefore needs to get created from a backend database. Precomputation of version cache objects, as taught by the present disclosure, also increases the performance of especially older versions in version comparison reports as these versions are infrequently used and therefore are frequently not in memory when a version comparison report is launched.

An aspect of the present disclosure relates to a computer-implemented method including receiving input data from a device. The input data includes cells. Each cell of the cells includes one of a numeric value or a formula. The computer-implemented method further includes generating a version cache object corresponding to the input data and generating a precomputed version cache object based on the version cache object by replacing formulas represented in the version cache object with values. Generation of the precomputed version cache object is imperceptible to a user of the device from which the input data originated. The computer-implemented method additionally includes receiving a signal indicating a result should be calculated, determining a precomputed version cache storage includes the precomputed version cache object, and sending output data to the device. The output data corresponds to the precomputed version cache object.

Another aspect of the present disclosure relates to a system including at least one processor and at least one memory including instructions that, when executed by the at least one processor, cause the system to perform a set of actions. The system is configured to receive input data from a device. The input data includes cells. Each cell of the cells includes one of a numeric value or a formula. The system is further configured to generate a version cache object corresponding to the input data and generate a precomputed version cache object based on the version cache object by replacing formulas represented in the version cache object with values. Generation of the precomputed version cache object is imperceptible to a user of the device from which the input data originated. The system is additionally configured to receive a signal indicating a result should be calculated, determine a precomputed version cache storage includes the precomputed version cache object, and send output data to the device. The output data corresponds to the precomputed version cache object.

A further aspect of the present disclosure relates to a first device including at least one processor and at least one memory including instructions that, when executed by the at least one processor, cause the first device to perform a set of actions. The first device is configured to receive input data from a second device. The input data includes cells. Each cell of the cells includes one of a numeric value or a formula. The first device is further configured to generate a version cache object corresponding to the input data and generate a precomputed version cache object based on the version cache object by replacing formulas represented in the version cache object with values. Generation of the precomputed version cache object is imperceptible to a user of the device from which the input data originated. The first device is additionally configured to receive a signal indicating a result should be calculated, determine a precomputed version cache storage includes the precomputed version cache object, and send output data to the second device. The output data corresponds to the precomputed version cache object.

BRIEF DESCRIPTION OF DRAWINGS

For a more complete understanding of the present disclosure, reference is now made to the following description taken in conjunction with the accompanying drawings.

DETAILED DESCRIPTION

FIGS. 1 and 2A-2C illustrate a system for precomputing version cache objects. A user interacts with a computing device 110, such as a desktop, laptop, tablet, smart phone, or other computing device. The computer device 110 may execute a web browser and the user may interact with the web browser to manipulate an internet-based spreadsheet or other structured data format. The computing device 110 may receive input from the user corresponding to a textual value associated with a cell of a data structure. The computing device 110 may also receive input from the user corresponding to a formula associated with a cell of the data structure. The formula may be structured to execute with respect to other cells of the same data structure and/or a different data structure (e.g., a different spreadsheet of data). The cells with respect to which the formula executes may include textual values and/or another formula.

As the computing device 110 receives input from the user (e.g., via a keyboard or touch sensitive surface), the computing device 110 sends (202) data corresponding thereto to one or more planning servers 130. For example, the computing device 110 may send data to the planning server(s) 130 each time a cell of the data structure is updated with text corresponding to either a value or a formula. Alternatively, the computing device 110 may send data to the planning server(s) 130 each time the user indicates data should be "saved." The computing device 110 may send data to (i.e., communicate with) the planning server(s) 130 over a hyper text transfer protocol (HTTP) or hyper text transfer protocol secure (HTTPS).

The planning server(s) 130 stores (206) data corresponding to the input data (i.e., a plan version) in a plan version storage 150. When the computing device 110 sends new data related to a previously created version to the planning server(s) 130, the planning server(s) 130 updates data corresponding to the applicable plan version stored in the plan version storage 150. The version cache objects kept in main-memory of the planning server(s) 130 may be considered cold cached because formulas represented in the version cache objects are at least partially uncomputed.

The system may include one or more precompute servers 140 that continuously generate precomputed version cache objects based on data corresponding to plan versions stored in the plan version storage 150. The precompute server(s) 140 may operate daemons that are not under the direct control of the computer device(s) 110. The precompute server(s) 140 is in communication with the plan version storage 150. The precompute server(s) 140 may monitor (208) the plan version storage 150 to determine when data corresponding to a plan version is newly stored therein. The precompute server(s) 140 may generate (210) a new version cache object in a buffer. The precompute server(s) 140 may generate (212) a precomputed version cache object based on the new plan version (e.g., by calculating the formulas contained in the new version cache object in the buffer). The precompute server(s) 140 persistently stores (214) the precomputed version cache object in a dedicated precomputed version cache storage 160. The precomputed version cache objects stored in the precomputed version cache storage 160 are considered hot cached because the precomputed version cache objects include values calculated from all the formulas.

The computing device 110 may send (216) a signal to the planning server(s) 130 indicating that a result for the plan corresponding should be provided to the computing device 110 for output to the user. The computing device 110 may generate the signal when a user indicates it desires an output for the plan. The planning server(s) 130 is in communication with the precomputed version cache storage 160.

Upon receiving the signal, the planning server(s) 130 may generate a dedicated in-memory data structure (i.e., a cold version cache). The data structure may include, at the beginning, all the formulas (i.e., uncalculated) and numeric values. The data structure may not persist in a dedicated storage (e.g., the plan version storage 150). The planning server(s) 130 replaces all formulas in data structure with corresponding calculated values. When this occurs, a user of the computing device 110 observes the calculated values. When the planning server(s) 130 receives the signal but does not already have the in-memory data structure for the corresponding plan version, the planning server(s) 130 reads one or more precomputed version cache objects associated with the plan version and stored in the precomputed version cache storage 160.

Thus, upon receiving the signal from the computing device 110, the planning server(s) 130 may determine (218) whether a version cache object associated with the plan version is stored in a buffer of the planning server(s) 130. Further, upon receiving the signal from the computing device 110, the planning server(s) 130 also determines (220) whether the precomputed version cache storage 160 includes a precomputed version cache object associated with the plan version. If the planning server(s) 130 determines a version cache object associated with the plan is not represented in a list of version cache objects to be pre-computed by the precompute server(s) 140 as well as determines the precomputed version cache storage 160 does not include a precomputed version cache object associated with the plan version, the planning server(s) 130 computes (222) an output for the plan using a new version cache object created in memory (e.g., buffer) of the planning server(s) 130 from the plan version stored in the plan version storage 150 and sends (224) results data corresponding thereto to the computing device 110. That is, the planning server(s) 130 computes the formulas represented in the version cache object buffered in the planning server(s) 130. Instead, if the planning server(s) 130 determines the precomputed version cache storage 160 includes a precomputed version cache object associated with the plan version, the planning server(s) 130 gets the precomputed version cache object from the precomputed version cache storage 160 and simply outputs (224) the results data of the plan indicated in the precomputed version cache object. If the planning server(s) 130 determines the precomputed version cache storage 160 does not include a precomputed version cache object associated with the plan, but determines data corresponding to the plan version is represented in a list of plan versions to be pre-computed by the precompute server(s) 140, the planning server(s) 130 waits (226) for the precompute server(s) 140 to generate a precomputed version cache object associated with the plan, at which time the planning server(s) 130 simply outputs (224) the results of the plan indicated in the precomputed version cache object. In another implementation, if the planning server(s) 130 determines the precomputed version cache storage 160 does not include a precomputed version cache object associated with the plan, but determines data corresponding to the plan version is represented in a list of plan versions to be pre-computed by the precompute server(s) 140, the planning server(s) 130 may generate a new version cache object (i.e., a cold version cache object) from the plan version data stored in the plan version storage 150, and may compute the required results data therefrom.

Figure 1:
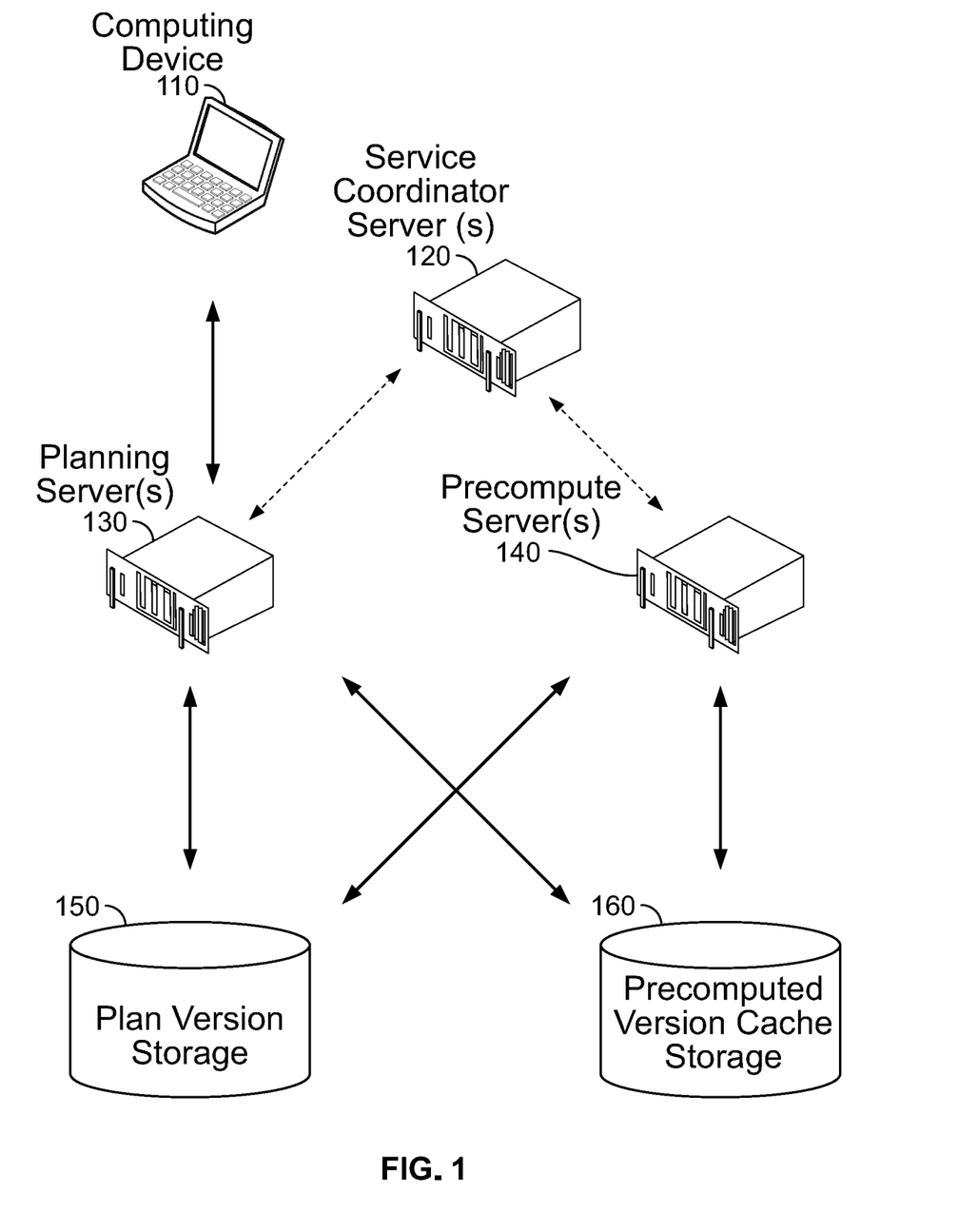
FIG. 1 illustrates a system configured to precomputed version cache objects according to embodiments of the present disclosure.
Figure 2A:
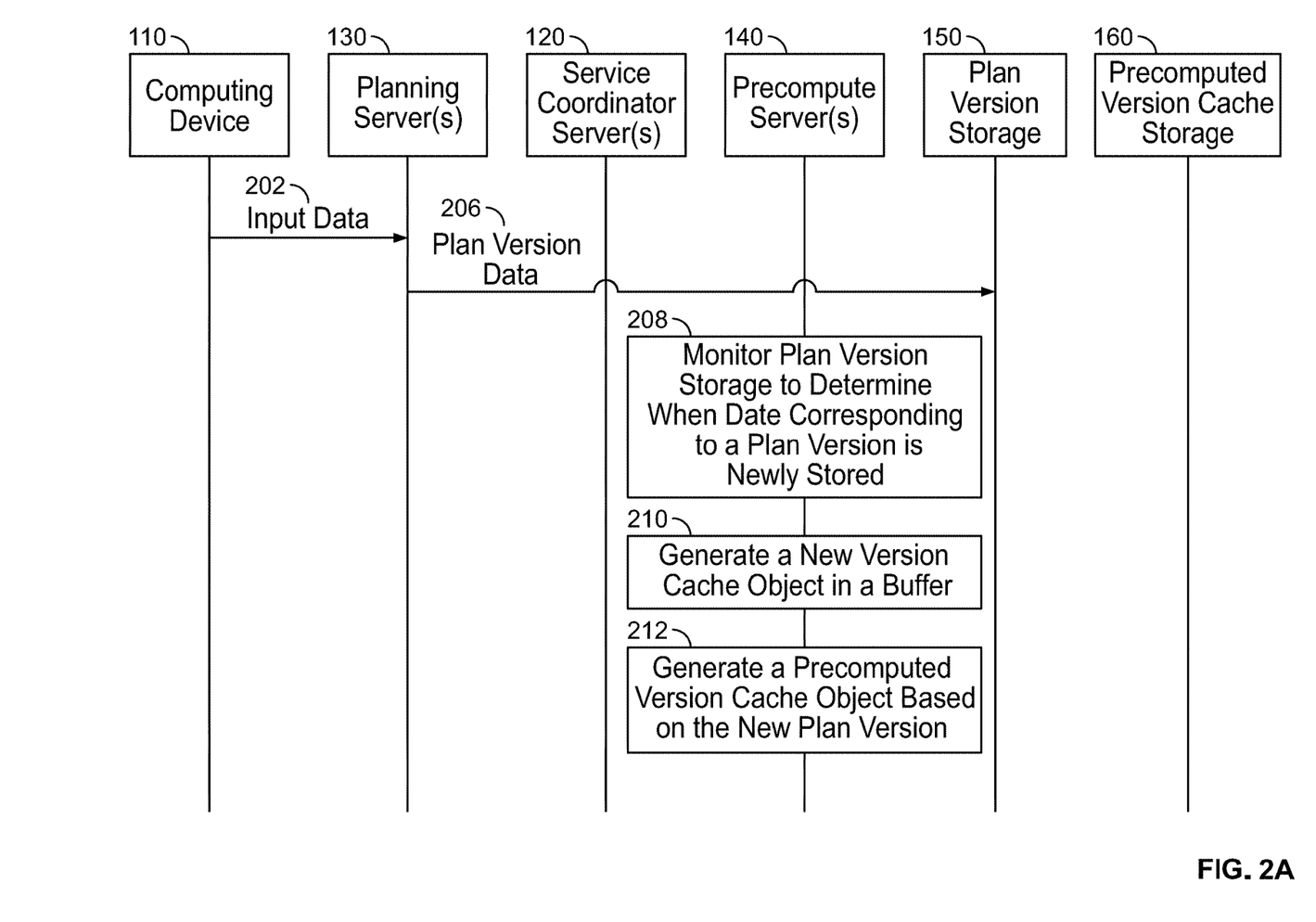
FIGS. 2A through 2C are a signal flow diagram illustrating the computation of data based on a precomputed version cache object according to embodiments of the present disclosure.
Figure 2B:
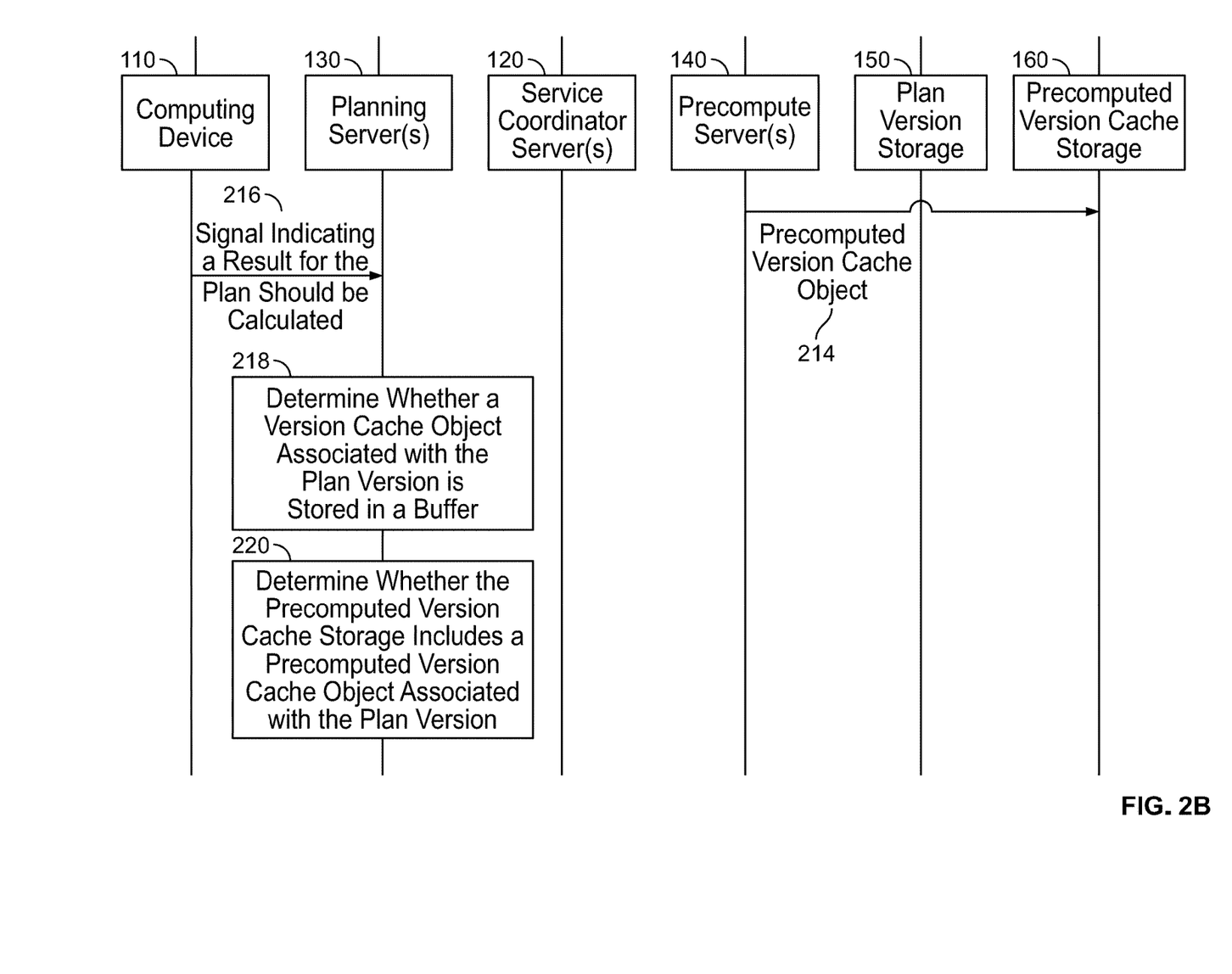
Figure 2C:
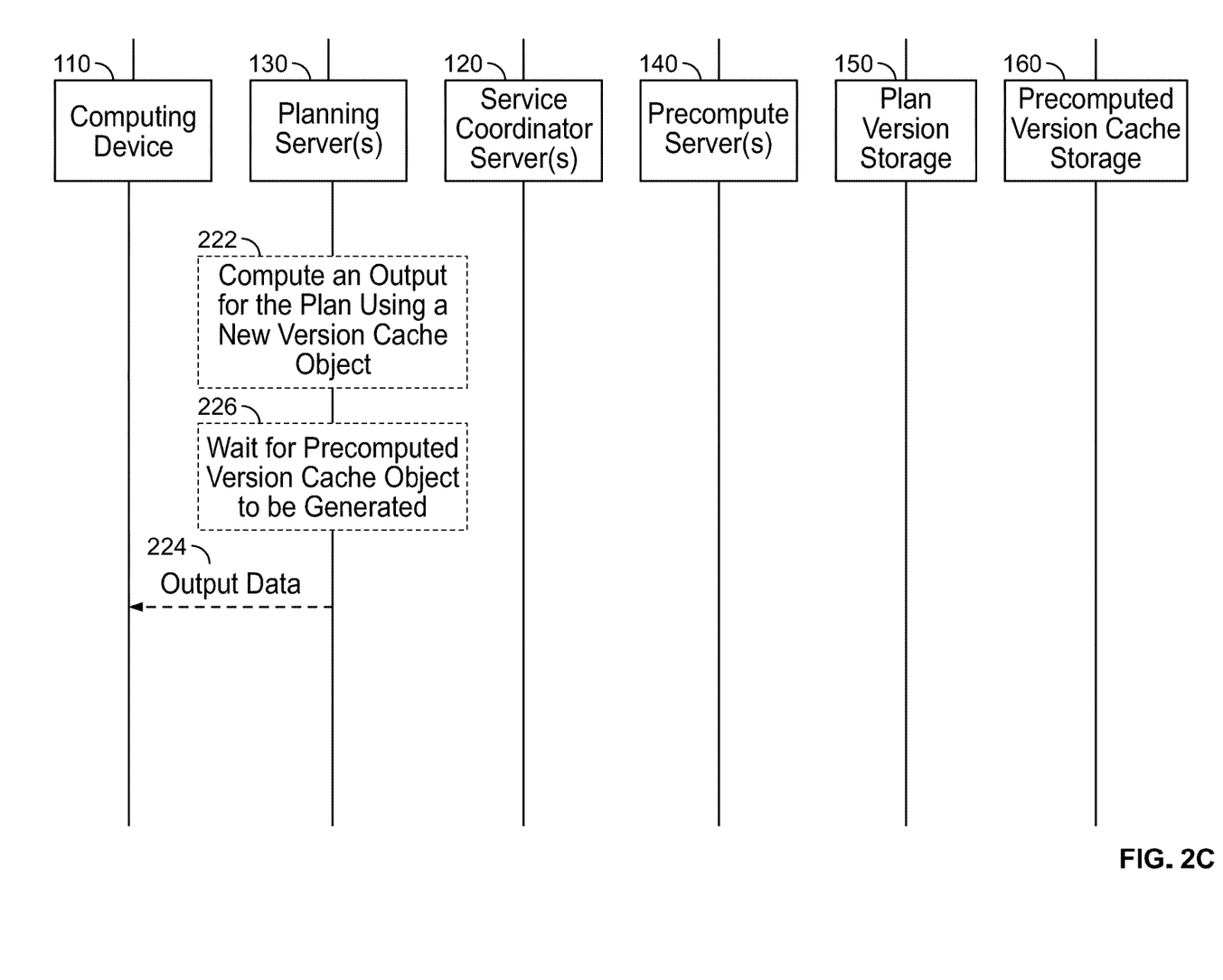

The system may be configured with multiple planning servers 130 to promote reliance and scalability. In an example, each planning server 130 may be configured as a "primary" server for operating with respect to a first set of user accounts and a "secondary"/"backup" server for operating with respect to a second set of user accounts. A set of user accounts may be associated with a common customer identifier. In another implementation, each planning server 130 may be configured as a "primary" server for operating with respect to a first set of plan versions and a "secondary"/ "backup" server for operating with respect to second set of plan versions. Other server partitioning schemas are also possible.

The system may further be configured with multiple precompute servers 140 to promote reliance and scalability. The load assigned to each precompute server 140 may depend upon system configuration. In an example, each precompute server 140 may be configured as a "primary" server for operating with respect to a first set of user accounts and a "secondary"/"backup" server for operating with respect to a second set of user accounts. Each set of user accounts may be associated with a different common customer identifier. In another example, each precompute server 140 may be configured to process the same number of versions and/or plans. In yet another example, each precompute server 140 may be configured to operate with respect to the same number of user accounts. In a further example, load may be assigned to each precompute server 140 based on user priority. In an additional example, load may be assigned to each precompute server 140 based on the precompute costs of the version cache objects. Other load partitioning schemas are also possible.

Multiple computing devices 110 may interact with the planning server(s) 130 of the system at any given moment. In certain instances, one or more planning servers 130 and/or one or more precompute servers 140 may experience a high server load, thereby leading to latency. The system may be configured with one or more service coordinator servers 120 configured to manage server load across the planning server(s) 130 and/or the precompute server(s) 140.

A master-worker configuration may be implemented, whereby the planning servers 130 play the role of masters and the precompute servers 140 play the role of workers. In this context, the planning servers 130 assign versions for precomputation to available precompute servers 140. The service coordinator server(s) 120 may be configured to perform planning server failover/master reelection and notify the acting planning servers 130 about changes in the availability of the precompute servers 140. This enables a reelected planning server 130 to recover system state as well as enable a planning server 130 to reassign precomputation tasks in case a precompute server(s) 140 becomes unavailable.

When a computing device 110 sends updated version data to the planning server(s) 130, the planning server(s) 130 writes changes made in the updated data to the corresponding plan version in the plan version storage 150. Also, a precomputed version cache object corresponding to the version cache object (or the effected parts thereof) may either be invalidated (i.e., cache invalidation) or the changes may be applied to the precomputed version cache object as well (i.e., cache write through).

The configuration of the disclosed system allows for different computation strategies (e.g., bottom-up, top-down, etc.) to be used in parallel to determine the fastest way to compute an output for a plan version. The system may determine the fastest computation strategy for a given plan (e.g., bottom-up or top-down), may generate metadata indicating the computation strategy, and may associate the metadata with one or more plan versions in the plan version storage 150 that are specific to the plan. When the planning server(s) 130 receives an indication from a computing device 110 to generate an output for a plan and no precomputed version cache objects exist for the plan or one or more of the plan's precomputed version cache objects are invalid/ outdated, the plan's metadata (stored in the plan version storage 150) may instruct the planning server(s) 130 regarding the computation strategy to use to most expediently generate an output.

A version cache sequence number may be maintained to allow the system to identify outdated precomputed version cache objects in the precomputed version cache storage 160. For example, when a precomputed version cache object is generated, the precomputed version cache object may be assigned a sequence number identical to or associated with a sequence number assigned to a corresponding plan version stored in the plan version storage 150. When the planning server(s) 130 updates the data corresponding to the plan version in the plan version storage 150, a new sequence number may be assigned to the updated data corresponding to the updated plan version, resulting in the updated data and the corresponding previously generated precomputed version cache object having different sequence numbers. This indicates to the system that the precomputed version cache object is outdated/invalid. If a cache write through is performed on the previously generated precomputed version cache object, the sequence number assigned to the updated data corresponding to the updated plan version may also be assigned to the updated precomputed version cache object, resulting in the updated precomputed version cache object being valid. The system may consider a precomputed version cache object valid if the sequence number associated with the precomputed version cache object is identical to or associated with the sequence number assigned to the present version of the corresponding plan version stored in the plan version storage 150.

Precomputations performed by the one or more precompute servers 140 may be performed on an iterative basis. When the precompute server(s) 140 determines a precomputed version cache object in the precomputed version cache storage 160 is invalid (e.g., based on having in improper sequence number), the precompute server(s) 140 may delete the invalid precomputed version cache object and replace it with a new precomputed version cache object computed from the most recent corresponding plan version data stored in the plan version storage 150.

Figure 3:
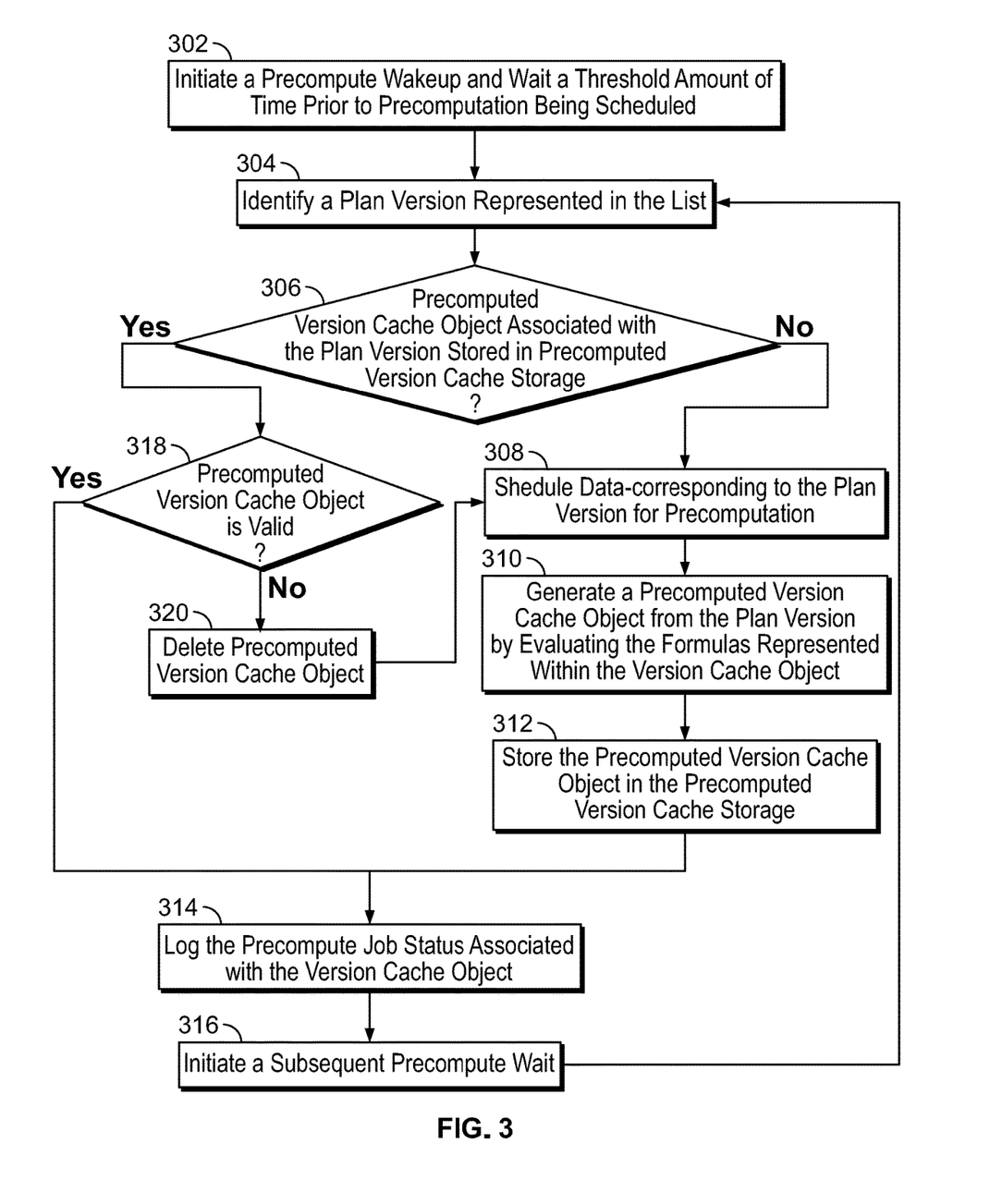
FIG. 3 is a process flow diagram illustrating a method for computing data across multiple versions of data according to embodiments of the present disclosure.

FIG. 3 illustrates a method for computing planning data across multiple versions of planning data. The method of FIG. 3 is described below with respect to precomputation of a single version cache object. However, it should be appreciated that the system may perform one or more of the processes of FIG. 3 with respect to multiple version cache objects in parallel.

As indicated above, the system may be configured to precompute on an iterative basis (e.g., once every 10 minutes, 30 minutes, 60 minutes, etc.). The system may initiate (302) a precompute wakeup wait a threshold amount of time prior to precomputation being scheduled to be performed. For example, the system may initiate the precompute wakeup wait 5 minutes prior to the system being configured to perform precomputations.

The system may include a list of version cache objects scheduled for precomputation. For example, the precompute server(s) 140 may continuously monitor the plan version storage 150 to determine plan versions data with respect to which precomputation should be performed. The precompute server(s) 140 may determine one or more such plan versions between scheduled precompute times. Thus, the precompute server(s) 140 may create a list of plan versions with respect to which precomputation should be performed. The plan versions represented in the list may be associated with more than one company having an account with the system. The plan versions may additionally be associated with more than one user account associated with the same company.

The system identifies (304) a plan version represented in the list and determines (306) whether a precomputed version cache object associated with the plan version is stored in the precomputed version cache storage 160. The list may be stored in the plan version storage 150 or a different storage, for example a dedicated storage only storing the list.

The system may select a portion of the plan versions represented in the list for precomputation. In one example, the plan versions may be selected for precomputation based on user preferences. In another example, the plan versions may be selected for precomputation based on system statistics, such as the frequency with which a plan version has been updated in a specified time period; the time it takes to precompute the version cache object, which may be a function of the data volume and the complexity of the functions represented in the various versions of the plan data; or the time since the version cache object was last used in planning and reporting operations.

If a precomputed version cache object associated with the plan version is not stored in the precomputed version cache storage 160, the system schedules (308) data corresponding to the plan version for precomputation. The system then generates (310) a precomputed version cache object from the plan version by evaluating the formulas represented within the corresponding version cache object. The plan version data may include cells, and each cell may either include a value or a formula. The precomputed version cache object generated therefrom may include corresponding cells that include calculated values for all formulas. The system stores (312) the precomputed version cache object in the precomputed version cache storage 160. The system may divide the precomputed version cache object into multiple components, and store the components in the precomputed version cache storage 160. In one example, a serialized (i.e., BLOB) precomputed version cache object may be divided into parts of different sizes. In another example, a precomputed version cache object may be divided based on lines of logical parts of the corresponding plan model (e.g. divided into different Cube sheets or modeled sheets of the plan version). The latter example enables the system to precompute specific logical parts of the models (e.g. some sheets) while evaluating other parts of the models on the fly in the planning server(s) 130. The precomputed version cache object (or the components thereof) may be stored in compressed binary form). The system logs (314) the precompute job status associated with the version cache object (e.g., as complete). The system then initiates (316) a subsequent precompute wait. The system may initiate a subsequent precompute after the duration of the precompute wait is over. The system may log the precompute job status for each plan version with respect to which the system performs precomputation. Moreover, the system may not initiate the precompute wait until the precompute job status for each plan version represented in the precompute list is logged/updated.

If a precomputed version cache object associated with the plan version is stored in the precomputed version cache storage 160, the system determines (318) whether the precomputed version cache object is valid (e.g., current). If the precomputed version cache object is valid, the system logs (314) the precompute job status associated with the plan version. Instead, if the precomputed version cache object is invalid, the system deletes (320) the precomputed version cache object and schedules (308) the data corresponding to the plan version for precomputation.

Figure 4:
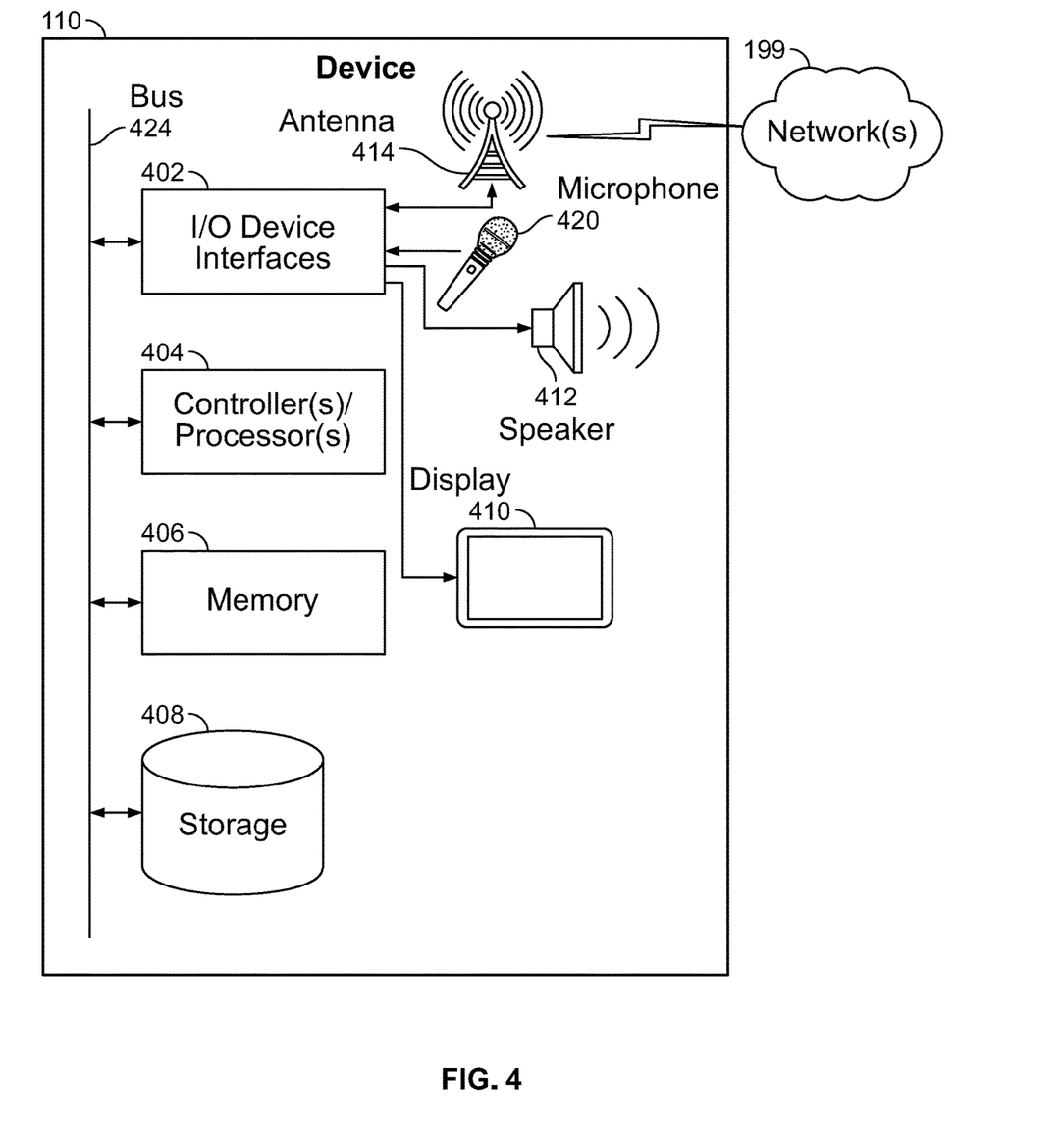
FIG. 4 is a block diagram conceptually illustrating example components of a device according to embodiments of the present disclosure.
Figure 5:
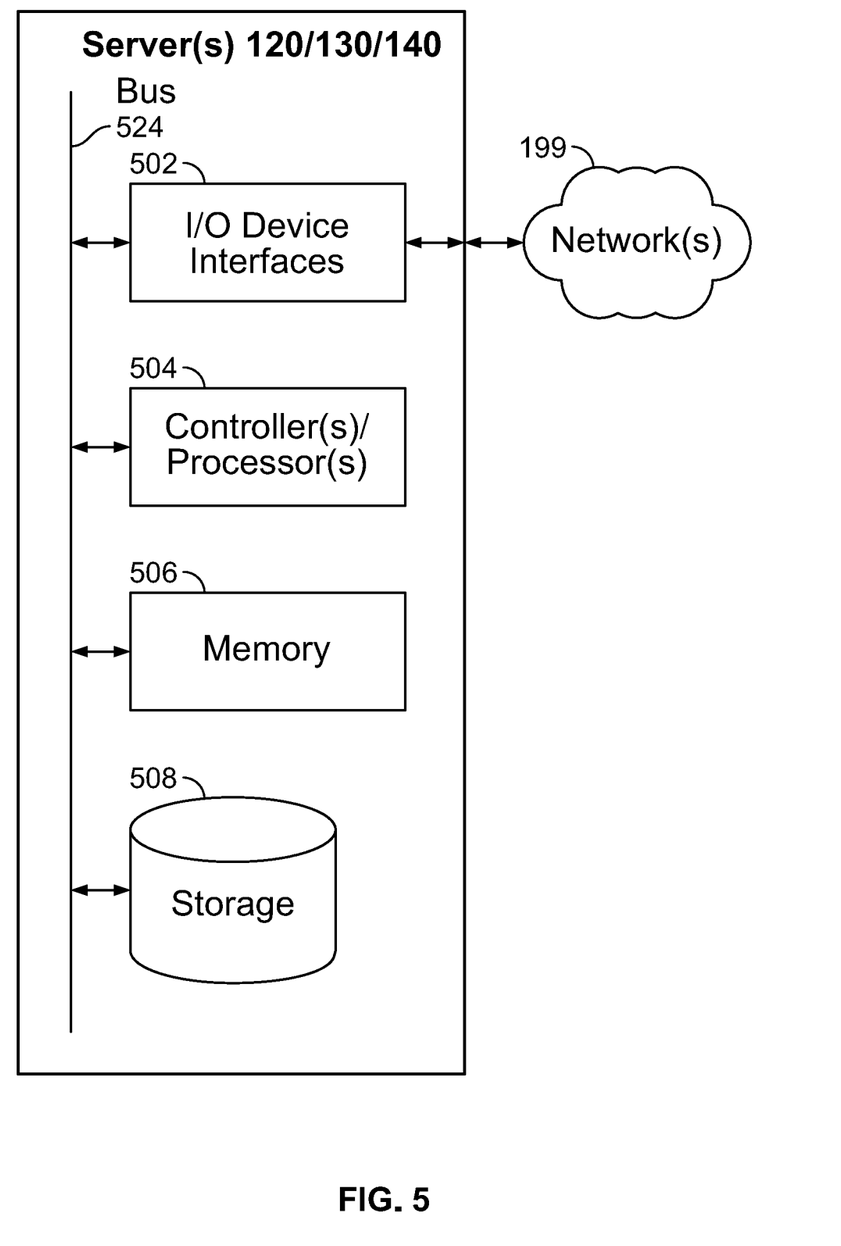
FIG. 5 is a block diagram conceptually illustrating example components of a server according to embodiments of the present disclosure.

FIG. 4 is a block diagram conceptually illustrating a computing device 110 that may be used with the described system. FIG. 5 is a block diagram conceptually illustrating example components of a remote device, such as the server(s) (120/130/140). Multiple servers (120/130/140) may be included in the system.

Each of these devices (110/120/130/140) may include one or more controllers/processors (404/504), which may each include a central processing unit (CPU) for processing data and computer-readable instructions, and a memory (406/506) for storing data and instructions of the respective device. The memories (406/506) may individually include volatile random access memory (RAM), non-volatile read only memory (ROM), non-volatile magnetoresistive memory (MRAM), and/or other types of memory. Each device (110/120/130/140) may also include a data storage component (408/508) for storing data and controller/processor-executable instructions. Each data storage component (408/508) may individually include one or more non-volatile storage types such as magnetic storage, optical storage, solid-state storage, etc. Each device (110/120/130/140) may also be connected to removable or external non-volatile memory and/or storage (such as a removable memory card, memory key drive, networked storage, etc.) through respective input/output device interfaces (402/502).

Computer instructions for operating each device (110/120/130/140) and its various components may be executed by the respective device's controller(s)/processor(s) (404/504), using the memory (406/506) as temporary "working" storage at runtime. A device's computer instructions may be stored in a non-transitory manner in non-volatile memory (406/506), storage (408/508), or an external device(s). Alternatively, some or all of the executable instructions may be embedded in hardware or firmware on the respective device in addition to or instead of software.

Each device (110/120/130/140) includes input/output device interfaces (402/502). A variety of components may be connected through the input/output device interfaces (402/502), as will be discussed further below. Additionally, each device (110/120/130/140) may include an address/data bus (424/524) for conveying data among components of the respective device. Each component within a device (110/120/130/140) may also be directly connected to other components in addition to (or instead of) being connected to other components across the bus (424/524).

Referring to FIG. 4, the device 110 may include input/output device interfaces 402 that connect to a variety of components such as an audio output component such as a speaker 412, a wired headset or a wireless headset (not illustrated), or other component capable of outputting audio. The device 110 may also include an audio capture component, for example a microphone 420. The device 110 may further include a display 410 configured to display content.

Via antenna(s) 414, the input/output device interfaces 402 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (402/502) may also include communication components that allow data to be exchanged between devices such as different physical servers in a collection of servers or other components.

The components of the device(s) 110 and the server(s) (120/130/140) may include their own dedicated processors, memory, and/or storage. Alternatively, one or more of the components of the device(s) 110 and the server(s) (120/130/140) may utilize the I/O interfaces (402/502), processor(s) (404/504), memory (406/506), and/or storage (408/508) of the device(s) 110 and server(s) (120/130/140), respectively.

As noted above, multiple devices may be employed in the system. In such a multi-device system, each of the devices may include different components for performing different aspects of the system's processing. The multiple devices may include overlapping components.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and data processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving input data associated with a plan version from a device, the input data including cells, each cell of a subset of the cells including one of a numeric value or a formula;
generating a version cache object corresponding to the input data;
assigning a precompute sequence number to the plan version;
generating a precomputed version cache object, comprising replacing at least one formula included in the version cache object with a precomputed numerical value, generating of the precomputed version cache object being imperceptible to a user of the device;
assigning the precompute sequence number to the precomputed version cache object;
receiving, from the device, a signal indicating a result should be calculated, wherein calculating the result comprises reading the precomputed version cache object;
determining whether the precompute sequence number for the precomputed version cache object matches a current sequence number assigned to the plan version; and
in response to a determination that the precompute sequence number for the precomputed version cache object does not match the current sequence number assigned to the plan version, replacing the precomputed numerical value with the at least one formula.

2. The computer-implemented method of claim 1, further comprising:
receiving second input data from the device;
generating second data corresponding to a second plan version corresponding to the second input data;
receiving, from the device, a second signal indicating second results should be calculated;
determining the second data is represented in a list of plan versions to be precomputed;
generating a second precomputed version cache object based on the second data; and
sending second output data to the device, the second output data corresponding to the second precomputed version cache object.

3. The computer-implemented method of claim 1, further comprising:
receiving second input data from the device;
generating second data corresponding to a second plan version corresponding to the second input data;
receiving, from the device, a second signal indicating second results should be calculated;
determining the second data is unrepresented in a list of plan versions to be precomputed;
determining a second precomputed version cache object is unrepresented in the precomputed version cache storage;
generating second output data by replacing formulas represented in the second data with values; and
sending the second output data to the device.

4. The computer-implemented method of claim 1, wherein the input data is first input data associated with a first unique identifier and the precomputed version cache object is associated with the first unique identifier, and wherein the computer-implemented method further comprises:
receiving second input data from the device;
generating, based on the second input data, second data corresponding to an updated plan version;
associating the second data with a second unique identifier; and
marking the precomputed version cache object as invalid based on the second data being associated with the second unique identifier and the precomputed version cache object being associated with the first unique identifier.

5. The computer-implemented method of claim 4, further comprising:
deleting the precomputed version cache object based on the second data being associated with the second unique identifier and the precomputed version cache object being associated with the first unique identifier.

6. The computer-implemented method of claim 4, further comprising:
generating, based on the second data, a second precomputed version cache object corresponding to an updated precomputed version cache object; and
associating the second precomputed version cache object with the second unique identifier.

7. A system comprising:
at least one processor; and
at least one memory including instructions that, when executed by the at least one processor, cause the system to:
receive input data associated with a plan version from a device, the input data including cells, each cell of a subset of the cells including one of a numeric value or a formula;
generate a version cache object corresponding to the input data;
assign a precompute sequence number to the plan version;
generate a precomputed version cache object, comprising replacing at least one formula included in the version cache object with a precomputed numerical value, generating of the precomputed version cache object being imperceptible to a user of the device;
assign the precompute sequence number to the precomputed version cache object;
receive, from the device, a signal indicating a result should be calculated, wherein calculating the result comprises reading the precomputed version cache object;
determine whether the precompute sequence number for the precomputed version cache object matches a current sequence number assigned to the plan version; and
in response to a determination that the precompute sequence number for the precomputed version cache object does not match the current sequence number assigned to the plan version, replace the precomputed numerical value with the at least one formula.

8. The system of claim 7, wherein the instructions, when executed by the at least one processor, further cause the system to:
receive second input data from the device;
generate second data corresponding to a second plan version corresponding to the second input data;

receive, from the device, a second signal indicating second results should be calculated;
determine the second data is represented in a list of plan versions to be precomputed;
generate a second precomputed version cache object based on the second data; and
send second output data to the device, the second output data corresponding to the second precomputed version cache object.

9. The system of claim 7, wherein the instructions, when executed by the at least one processor, further cause the system to:
receive second input data from the device;
generate second data corresponding to a second plan version corresponding to the second input data;
receive, from the device, a second signal indicating second results should be calculated;
determine the second data is unrepresented in a list of plan versions to be precomputed;
determine a second precomputed version cache object is unrepresented in the precomputed version cache storage;
generate second output data by replacing formulas represented in the second data with values; and
send the second output data to the device.

10. The system of claim 7, wherein the input data is first input data associated with a first unique identifier and the precomputed version cache object is associated with the first unique identifier, and wherein the instructions, when executed by the at least one processor, further cause the system to:
receive second input data from the device;
generate, based on the second input data, second data corresponding to an updated plan version;
associate the second data with a second unique identifier; and
mark the precomputed version cache object as invalid based on the second data being associated with the second unique identifier and the precomputed version cache object being associated with the first unique identifier.

11. The system of claim 10, wherein the instructions, when executed by the at least one processor, further cause the system to:
delete the precomputed version cache object based on the second data being associated with the second unique identifier and the precomputed version cache object being associated with the first unique identifier.

12. The system of claim 10, wherein the instructions, when executed by the at least one processor, further cause the system to:
generate, based on the second data, a second precomputed version cache object corresponding to an updated precomputed version cache object; and
associate the second precomputed version cache object with the second unique identifier.

13. The system of claim 7, wherein the instructions, when executed by the at least one processor, further cause the system to:
generate precomputed version cache objects based on data corresponding to plan versions received subsequent to a previous precomputation iteration.

14. A first device comprising:
at least one processor; and
at least one memory including instructions that, when executed by the at least one processor, cause the first device to:

receive input data associated with a plan version from a second device, the input data including cells, each cell of a subset of the cells including one of a numeric value or a formula;
generate a version cache object corresponding to the input data;
assign a precompute sequence number to the plan version;
generate a precomputed version cache object, comprising replacing at least one formula included in the version cache object with a precomputed numerical value, generating of the precomputed version cache object being imperceptible to a user of the device;
assign the precompute sequence number to the precomputed version cache object;
receive, from the second device, a signal indicating a result should be calculated, wherein calculating the result comprises reading the precomputed version cache object;
determine whether the precompute sequence number for the precomputed version cache object matches a current sequence number assigned to the plan version; and
in response to a determination that the precompute sequence number for the precomputed version cache object does not match the current sequence number assigned to the plan version, replace the precomputed numerical value with the at least one formula.

15. The first device of claim 14, wherein the instructions, when executed by the at least one processor, further cause the first device to:
receive second input data from the second device;
generate second data corresponding to a second plan version corresponding to the second input data;
receive, from the second device, a second signal indicating second results should be calculated;
determine the second data is represented in a list of plan versions to be precomputed;
generate a second precomputed version cache object based on the second data; and
send second output data to the second device, the second output data corresponding to the second precomputed version cache object.

16. The first device of claim 14, wherein the instructions, when executed by the at least one processor, further cause the first device to:
receive second input data from the second device;
generate second data corresponding to a second plan version corresponding to the second input data;
receive, from the second device, a second signal indicating second results should be calculated;
determine the second data is unrepresented in a list of plan versions to be precomputed;
determine a second precomputed version cache object is unrepresented in the precomputed version cache storage;
generate second output data by replacing formulas represented in the second data with values; and
send the second output data to the second device.

17. The first device of claim 14, wherein the input data is first input data associated with a first unique identifier and the precomputed version cache object is associated with the first unique identifier, and wherein the instructions, when executed by the at least one processor, further cause the first device to:
receive second input data from the second device;
generate, based on the second input data, second data corresponding to an updated plan version;

associate the second data with a second unique identifier; and mark the precomputed version cache object as invalid based on the second data being associated with the second unique identifier and the precomputed version cache object being associated with the first unique identifier.

18. The first device of claim 17, wherein the instructions, when executed by the at least one processor, further cause the first device to:

delete the precomputed version cache object based on the second data being associated with the second unique identifier and the precomputed version cache object being associated with the first unique identifier.

19. The first device of claim 17, wherein the instructions, when executed by the at least one processor, further cause the first device to:

generate, based on the second data, a second precomputed version cache object corresponding to an updated precomputed version cache object; and associate the second precomputed version cache object with the second unique identifier.

20. The first device of claim 14, wherein the instructions, when executed by the at least one processor, further cause the first device to:

generate precomputed version cache objects based on data corresponding to plan versions received subsequent to a previous precomputation iteration.

21. The computer-implemented method of claim 1, further comprising:

determining a precomputed version cache storage includes the precomputed version cache object.

* * * * *